United States Patent
Dargude et al.

(10) Patent No.: US 11,301,568 B1
(45) Date of Patent: Apr. 12, 2022

(54) SYSTEMS AND METHODS FOR COMPUTING A RISK SCORE FOR STORED INFORMATION

(71) Applicant: Veritas Technologies LLC, Mountain View, CA (US)

(72) Inventors: Shailesh Dargude, San Jose, CA (US); Satish Grandhi, Santa Clara, CA (US); Anand Athavale, San Jose, CA (US); Rohit Nath, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 272 days.

(21) Appl. No.: 16/116,490

(22) Filed: Aug. 29, 2018

Related U.S. Application Data (60) Provisional application No. 62/653,541, filed on Apr. 5, 2018.

(51) Int. Cl.
*H04L 29/00* (2006.01)
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
USPC .......................................................... 726/25
See application file for complete search history.

(56) References Cited

U.S. PATENT DOCUMENTS

| | | | | |
|---|---|---|---|---|
| 9,762,603 | B2* | 9/2017 | Grondin | G06F 21/6245 |
| 9,800,606 | B1* | 10/2017 | Yumer | G06F 21/577 |
| 2015/0317339 | A1 | 11/2015 | Vranyes et al. | |
| 2017/0323389 | A1* | 11/2017 | Vavrasek | H04L 63/1425 |

OTHER PUBLICATIONS

Brownlee, Jason, "A Gentle Introduction to the Bag-of-Words Model", URL: https://machinelearningmastery.com/gentle-inlroduction-bag-words-model/, Machine Learning Mastery, Oct. 9, 2017, 24 pages.
Socher et al., "CS 2240: Deep Learning for NLP", URL: https://cs224d.stanford.edu/lecture_notes/notes1.pdf, Lecture Notes: Part 1, 2016, pp. 1-10.
Kasturi et al., "Systems and Methods for Data Management of Multiple Cloud Services", U.S. Appl. No. 16/375,243, filed Apr. 4, 2019, 69 pages.
Veritas, "Veritas Information Map Installation and Administration Guide", URL: https://www.veritas.com/content/support/en US/doc/109835244-109835565-1, Jan. 30, 2018, 81 pages.

(Continued)

*Primary Examiner* — Brandon S Hoffman
*Assistant Examiner* — Michael D Anderson
(74) *Attorney, Agent, or Firm* — FisherBroyles, LLP (57) ABSTRACT

The disclosed computer-implemented method for computing a risk score for stored information may include (1) extracting factor-specific information from metadata describing characteristics of files stored on multiple storage devices, (2) assigning at least one respective factor score to at least one respective factor based at least in part on the factor-specific information, and (3) calculating the risk score from the at least one factor score. Various other methods, systems, and computer-readable media are also disclosed.

21 Claims, 4 Drawing Sheets

(56) References Cited

OTHER PUBLICATIONS

Dargude et al., "Systems and Methods for Managing User Entitlements of Objects from Heterogeneous Content Sources", U.S. Appl. No. 16/374,409, filed Apr. 3, 2019, 59 pages.
Dargude et al., "Systems and Methods for Prioritizing and Detecting File Datasets Based on Metadata", U.S. Appl. No. 16/374,568, filed Apr. 3, 2019, 43 pages.
Grandhi et al., "Systems and Methods for Generating Resource Definitions for Micro-Service-Based Platform-as-a-Service Architecture", U.S. Appl. No. 16/115,020, filed Aug. 28, 2018, 60 pages.
Dargude et al., "Systems And Methods for Normalizing Data Store Classification Information", U.S. Appl. No. 16/116,522, filed Aug. 29, 2018, 49 pages.
International Search Report and Written Opinion received for PCT Application Serial No. PCT/US2019/025801 dated Jul. 12, 2019, 10 pages.
Veritas, "Information Map Feature Briefing Veritas Information Map", URL: https://www.veritas.com/content/support/en US/doc/ka6j0000000L71WAAS, Jan. 1, 2016, 8 pages.
Veritas, "Information Map Whitepaper Security In-Depth", URL: https://www.veritas.com/content/support/en US/doc/ka6j0000000L8hfAAC, Jan. 1, 2017, 25 pages.
Veritas, "Veritas Information Map User Guide", URL: https://www.veritas.com/content/support/en US/doc/107111172-109780806-1, Nov. 21, 2017, 379 pages.

\* cited by examiner

SYSTEMS AND METHODS FOR COMPUTING A RISK SCORE FOR STORED INFORMATION

CROSS REFERENCE TO RELATED APPLICATION

This application claims the benefit of U.S. Provisional Application No. 62/653,541, titled "MULTI-CLOUD DATA MANAGEMENT SYSTEMS AND METHODS", filed Apr. 5, 2018, the disclosure of which is incorporated, in its entirety, by this reference.

BACKGROUND

Some organizations generate tremendous quantities of stored information, some of which may include sensitive information such as personally identifiable information (PII), health care records, classified information, and trade secrets. Organizations often employ storage services, such as cloud storage providers, to cost-effectively store these vast quantities of information in information stores, repositories, and cloud storage devices. Unfortunately, storing sensitive information in this way may expose organizations to risk resulting from remotely storing the information, risk resulting from entrusting another party to store the information, and/or risk associated with transferring the information over a network. While organizations may want to protect against these risks, to do so effectively organizations may need to quantify the risk associated with specific information being stored on specific information storage devices.

SUMMARY

As will be described in greater detail below, the instant disclosure describes various systems and methods for computing a risk score for stored information. In some examples, the provided systems and methods may analyze factors indicated by metadata of the stored information to produce factor scores and may calculate risk scores based on the factor scores.

In one embodiment, a method for computing a risk score for stored information may include (1) extracting factor-specific information from metadata describing characteristics of files stored on multiple storage devices, (2) assigning at least one respective factor score to at least one respective factor based at least in part on the factor-specific information, and (3) calculating the risk score from the at least one factor score.

In some embodiments, the metadata associated with at least one of the files may indicate at least one of a file identifier, a file access attempt history, a file location, a file size, and/or a presence of sensitive information in the file.

In some examples, the at least one respective factor may be in a plurality of factors that includes a factor indicating sensitivity of information in a respective file and/or a factor indicating permission distance between multiple categories of users who are permitted to access the respective file.

In an example, the at least one respective factor may be in a plurality of factors that includes (1) a factor indicating a percentage of total information, in a respective file, having at least a minimum level of sensitivity, (2) a factor indicating a percentage of total users who are permitted to access the respective file, (3) a factor indicating a percentage of total users who are permitted to access sensitive files, (4) a factor indicating a percentage of unique tags associated with the respective file, (5) a factor indicating a percentage of highly sensitive files in a plurality of sensitive files, (6) a factor indicating an average number of instances of patterns per sensitive file, (7) a factor indicating a location of the respective file, (8) a factor indicating characteristics of a control point, (9) a factor indicating a type of data source associated with the respective file, and/or (10) a factor indicating a level of security for the storage device storing the respective file.

In an embodiment, calculating may further include adding respective factor scores for different factors. In some examples, calculating may further include weighting the at least one factor score with a respective weight. In an example, the method may further include receiving the respective weight from a user interface. In some embodiments, the at least one respective factor may be in a plurality of factors having respective factor scores and calculating may further include weighting the factor scores with respective weights, adding the respective weighted factor scores, and dividing the sum of the respective weighted factor scores by a total number of factors in the plurality of factors. In some embodiments, calculating the risk score may include calculating the risk score for at least one of a file, a directory, and a storage device.

In an embodiment, the method may further include performing an action on a file in response to a value of the risk score. In some embodiments, the action may include modifying a permission to access the file. In an embodiment, the method may further include displaying, on a user display, the risk score. In some embodiments, the method may further include sending information describing the risk score via a network interface.

In one example, a system for computing a risk score for stored information may include several modules stored in memory, including (1) an extracting module that extracts factor-specific information from metadata describing characteristics of files stored on multiple storage devices, (2) an assigning module that assigns at least one respective factor score to at least one respective factor based at least in part on the factor-specific information, and (3) a calculating module, stored in the memory, that calculates the risk score from the at least one factor score. The system may also include at least one physical processor that executes the extracting module, the assigning module, and the calculating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) extract factor-specific information from metadata describing characteristics of files stored on multiple storage devices, (2) assign at least one respective factor score to at least one respective factor based at least in part on the factor-specific information, and (3) calculate the risk score from the at least one factor score.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for computing a risk score for stored information. Also provided are techniques for using information describing different risk factors as at least a partial basis for calculating risk scores. Further provided are techniques for determining factor scores describing risk associated with respective risk factors. As will be explained in greater detail below, systems and methods described herein may automatically perform techniques that compute risk scores for stored information.

In some embodiments, the provided techniques may collect information describing respective levels of sensitivity and/or risk of stored files. For example, a classifier may open files and read lines of file content in the files to identify sensitive information in the files. The provided techniques may also collect information about factors such as who wrote the files, permissions of respective file writers, who owns the files (e.g., which subdivisions of originations), who is responsible for maintaining the files, and/or who accesses the files. In some examples, the provided techniques may collect information about factors identifying types of sensitive information being stored in respective files, such as personally identifiable information (PII), health care records, classified information, trade secrets, financial information, and the like.

The collected information may be assigned a respective factor score. The factor scores may be weighted, as some factors may be associated with higher levels of risk than other factors. The provided techniques may combine factor scores using an algorithm to calculate respective risk scores for at least one file, at least one directory, at least one drive, at least one storage device, at least one server, at least one cloud service provider, and/or the like.

In some examples, risk scores may be displayed via user displays and/or transmitted via networks to at least one location other than the locations that calculated the risk score. In some embodiments, risk scores may be included in data privacy compliance reports.

Risk scores may be used to identify at least one file, at least one directory, at least one drive, at least one storage device, at least one server, at least one cloud service provider, and/or the like for which read, write, and/or access permissions may be assigned and/or changed. In some examples, risk scores may be used to identify at least one file, at least one directory, at least one drive, at least one storage device, at least one server, at least one cloud service provider, and/or the like which may be deleted and/or modified to mitigate associated risk. In some embodiments, risk scores may be used to identify at least one file, at least one directory, at least one drive, at least one storage device, at least one server, at least one cloud service provider, and/or the like which may be deleted and/or modified to mitigate associated risk.

By doing so, the systems and methods described herein may improve the overall functionality of various computing devices. Examples of computing devices in which the provided techniques may be implemented include, and are not limited to, laptop computers, tablet computers, desktop computers, wearable computing devices (e.g., smart watches, smart glasses), smartphone devices, identify verification devices, access control devices, and/or smart televisions. For example, the provided techniques may advantageously identify levels of risk associated with stored information. Further, the provided techniques may advantageously identify a quantity of risk associated with specific information being stored on specific information storage devices. Also, the systems and methods described herein may beneficially improve data protection services and/or software, which in turn may beneficially save power, network bandwidth, and time.

Figure 1:
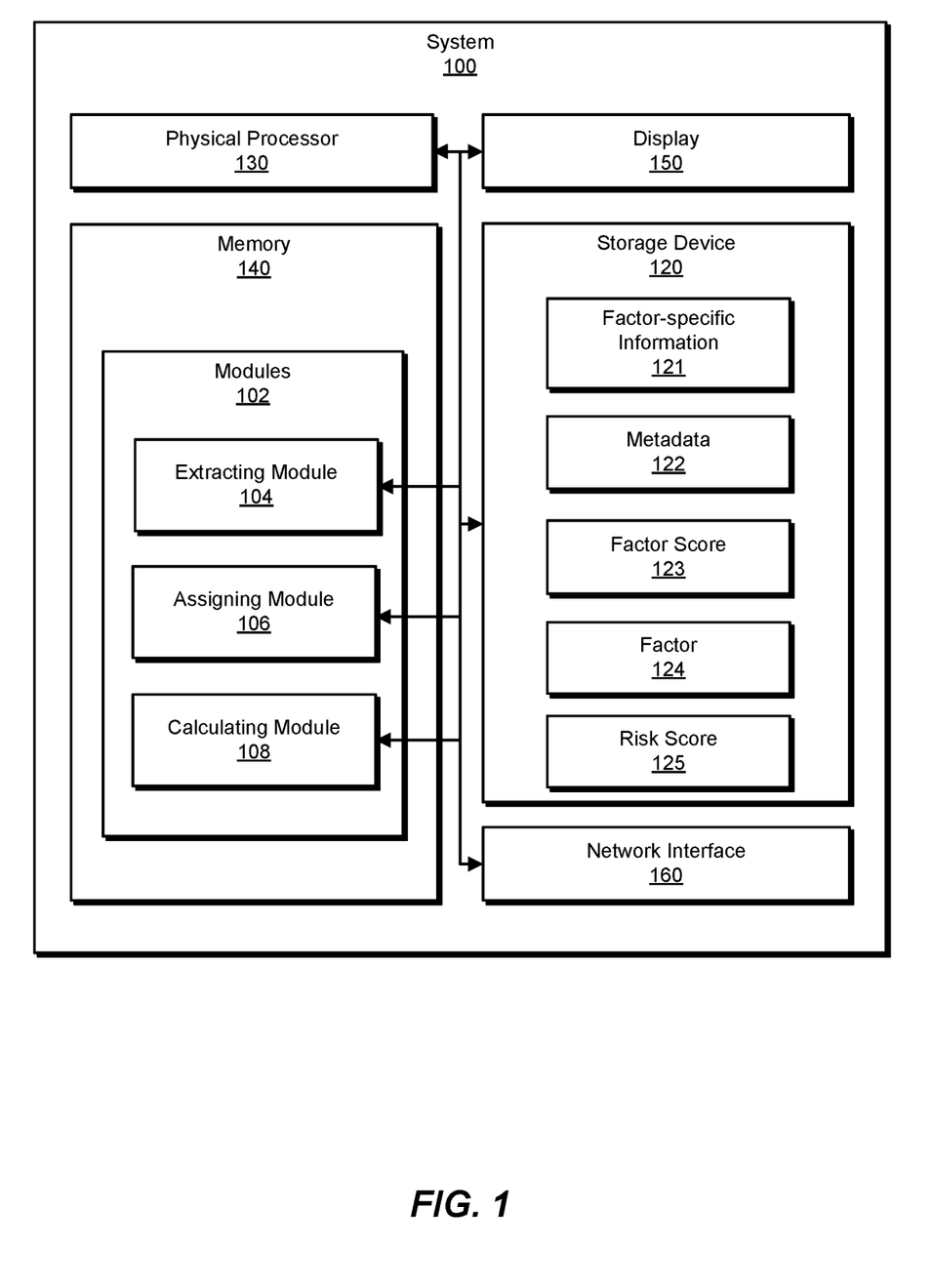
FIG. 1 is a block diagram of an example system for computing a risk score for stored information.
Figure 2:
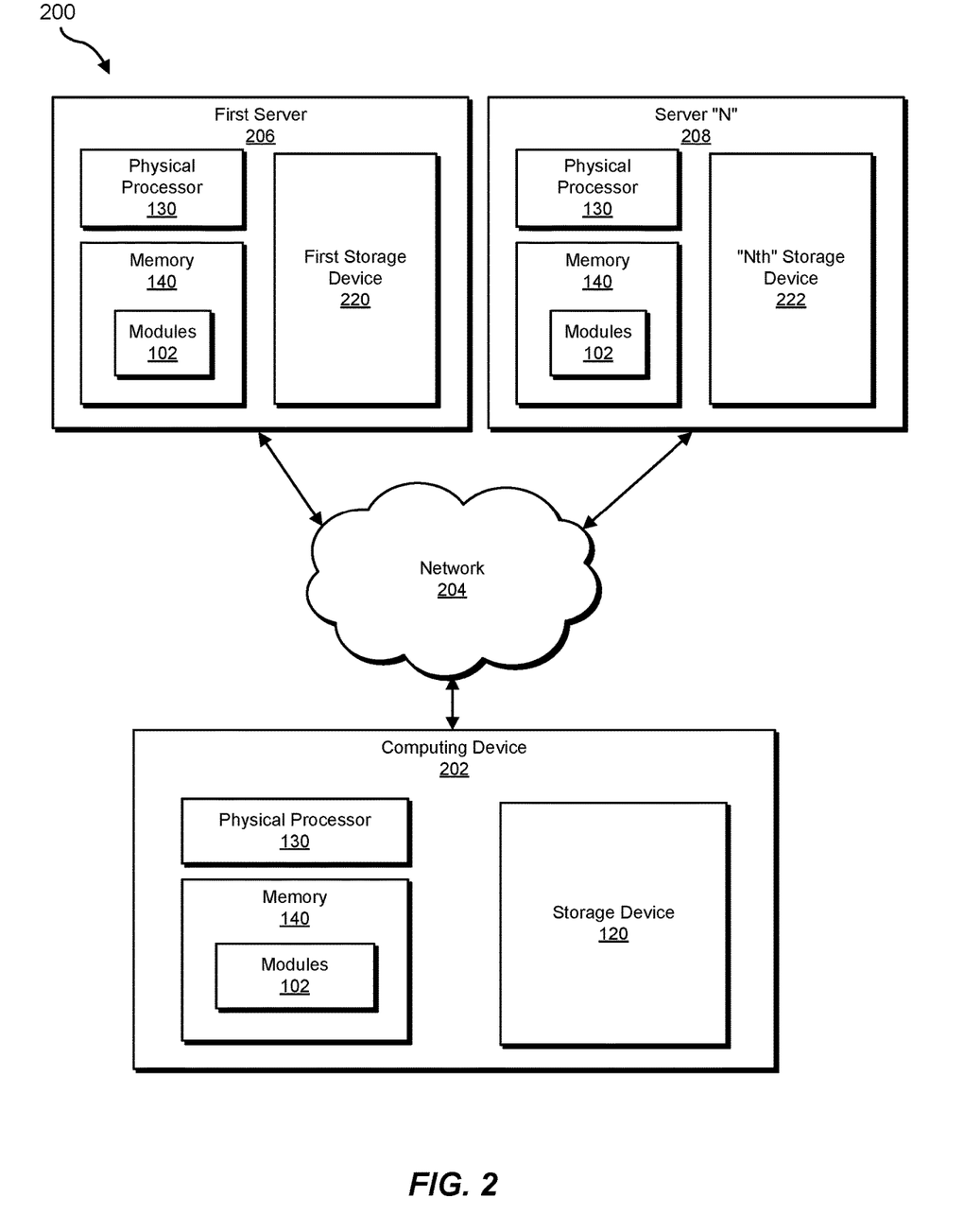
FIG. 2 is a block diagram of an additional example system for computing a risk score for stored information.
Figure 3:
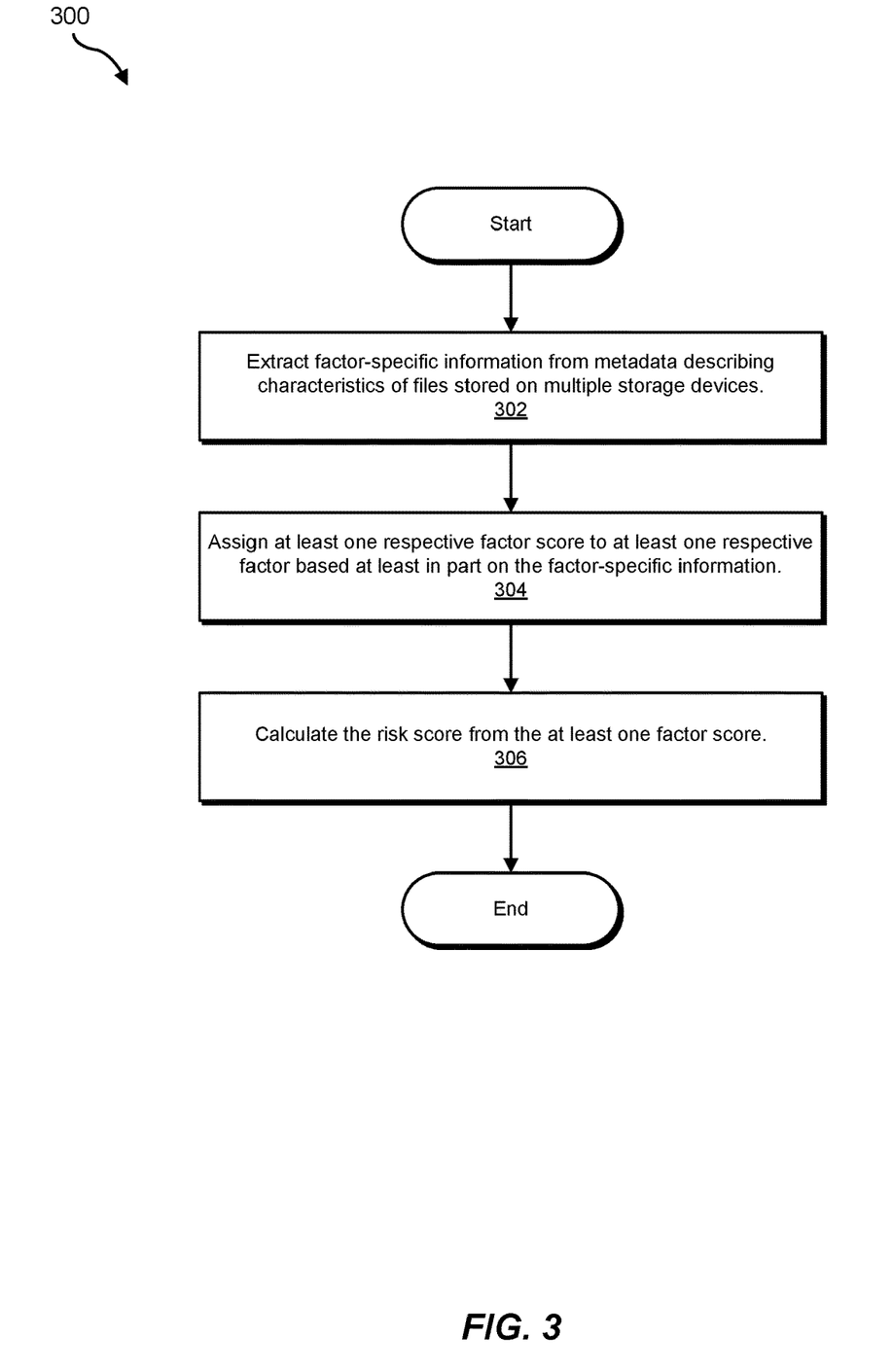
FIG. 3 is a flow diagram of an example method for computing a risk score for stored information.
Figure 4:
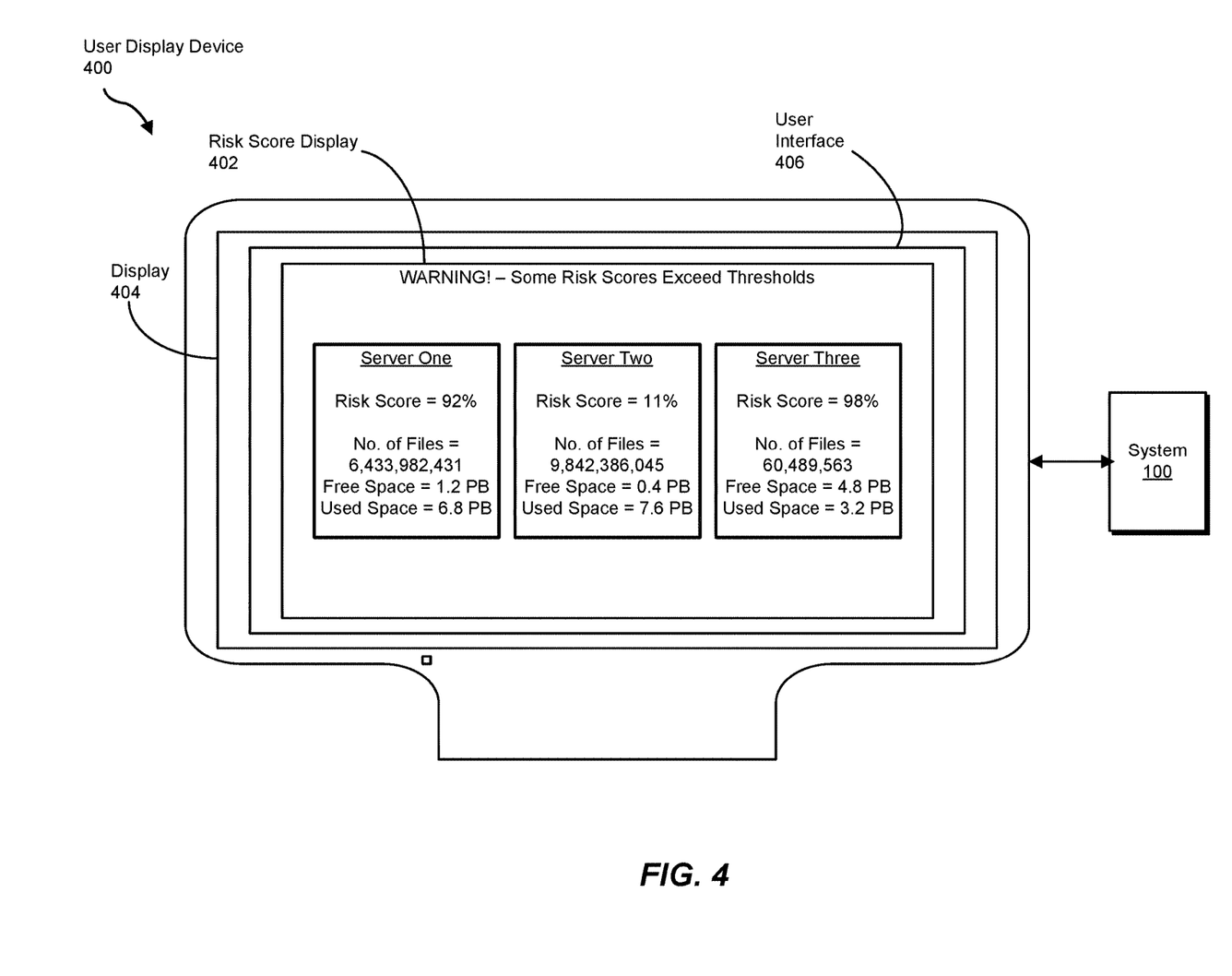
FIG. 4 is a block diagram of an example risk score and warning message displayed on a user display device.

The following will provide, with reference to FIGS. 1-2 and 4, detailed descriptions of example systems for computing a risk score for stored information. Detailed descriptions of corresponding computer-implemented methods will also be provided in connection with FIG. 3.

FIG. 1 is a block diagram of an example system 100 for computing a risk score for stored information. As illustrated in this figure, example system 100 may include one or more modules 102 for performing one or more tasks. As will be explained in greater detail below, modules 102 may include an extracting module 104, and assigning module 106, and/or a calculating module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, and/or server 208). One or more of modules 102 in FIG. 1 may also represent all or portions of one or more special-purpose computers configured to perform one or more tasks.

Returning to FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain one or more of factor-specific information 121, metadata 122, a factor score 123, a factor 124, and/or a risk score 125. Examples of storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some non-limiting embodiments, metadata 122 may describe characteristics of files stored on multiple storage devices such as storage device 120, a storage device coupled to first server 206 in FIG. 2, a storage device coupled to server "N" 208 in FIG. 2, and/or the like.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate computing a risk score for stored information. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more displays, such as display 150. In some examples, display 150 may be a touchscreen. Thus, display 150 may be a touch sensing device configured to receive input, such as swipes, via users' touches imparted by users on display 150 when users touch display 150. In some examples, display 150 may implement technologies such as capacitive sensing, resistive sensing, pressure sensing, etc. Display 150 may also be an image (e.g., video) display device configured to display a user interface (e.g., user interface 406 in FIG. 4).

As illustrated in FIG. 1, example system 100 may also include one or more network interfaces, such as network interface 160. Network interface 160 broadly represents any type or form of communication device or adapter capable of facilitating communication between example system 100 and one or more additional devices. For example, in certain embodiments network interface 160 may facilitate communication between example system 100 and a private or public network including additional computing systems. Examples of network interface 160 include, without limitation, a wired network interface (such as a network interface card), a wireless network interface (such as a wireless network interface card), a modem, and any other suitable interface. In at least one embodiment, network interface 160 may provide a direct connection to a remote server via a direct link to a network, such as the Internet. Network interface 160 may also indirectly provide such a connection through, for example, a local area network (such as an Ethernet network), a personal area network, a telephone or cable network, a cellular telephone connection, a satellite data connection, or any other suitable connection.

In certain embodiments, network interface 160 may also represent a host adapter configured to facilitate communication between example system 100 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Network interface 160 may also allow example system 100 to engage in distributed or remote computing. For example, network interface 160 may receive instructions from a remote device or send instructions to a remote device for execution.

Example system 100 in FIG. 1 may be implemented in a variety of ways. For example, all or a portion of example system 100 may represent portions of example system 200 in FIG. 2. As shown in FIG. 2, system 200 may include a computing device 202 in communication via a network 204 with at least one server such as first server 206 and/or server "N" 208. In one example, all or a portion of the functionality of modules 102 may be performed by computing device 202, first server 206, server "N" 208, and/or any other suitable computing system. As will be described in greater detail below, one or more of modules 102 from FIG. 1 may, when executed by at least one processor of computing device 202, first server 206, and/or server "N" 208, enable computing device 202, first server 206, and/or server "N" 208 to compute a risk score for stored information.

Computing device 202 generally represents any type or form of computing device capable of reading computer-executable instructions. For example, computing device 202 may represent a device running risk management software, anti-malware software, and/or compliance software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and servers 206-208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Servers 206-208 generally represent any type or form of computing device that reads computer-executable instructions. For example, servers 206-208 may represent a server running server-side software, such as storage device management software, risk management software, anti-malware software, and/or compliance software (e.g., data privacy compliance software). Additional examples of servers 206-

208 include, without limitation, storage servers, database servers, application servers, and/or web servers configured to run certain software applications and/or provide various storage, database, and/or web services. Although illustrated as single entities in FIG. 2, servers 206-208 may include and/or represent a plurality of servers that work and/or operate in conjunction with one another.

In some examples, servers 206-208 may include one or more storage devices such as first storage device 220 and "Nth" storage device 222. Storage devices 220-222 generally represent any type or form of volatile or non-volatile storage device or medium capable of storing data and/or computer-readable instructions. In one example, storage devices 220-222 may store, load, and/or maintain one or more files having characteristics described by metadata 122. Examples of storage devices 220-222 include, without limitation, Random Access Memory, Read Only Memory, flash memory, Hard Disk Drives, Solid-State Drives, optical disk drives, caches, variations or combinations of one or more of the same, and/or any other suitable storage memory.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for computing a risk score for stored information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may extract factor-specific information from metadata describing characteristics of files stored on multiple storage devices. The systems described herein may perform step 302 in a variety of ways. For example, extracting module 104 may, as part of computing device 202 in FIG. 2, extract factor-specific information 121 from metadata 122 describing characteristics of files stored on multiple storage devices (e.g., first storage device 220 in FIG. 2, "Nth" storage device 222 in FIG. 2, and/or the like).

In some examples, metadata associated with at least one of the files may describe properties of respective files, respective storage devices, and/or respective directories. In some embodiments, metadata associated with at least one of the files may indicate a file identifier, a file access attempt history, a file location, a file size, and/or the presence of sensitive information in the file.

In some embodiments, the provided techniques may collect metadata describing respective levels of sensitivity and/or risk of stored files. For example, a classifier may open files and read lines of file content in the files to identify sensitive information in the files. The provided techniques may also collect metadata about factors such as who wrote the files, permissions of respective file writers, who owns the files (e.g., which subdivision of the origination), who is responsible for maintaining the files, and/or who accesses the files. In some examples, the provided techniques may collect metadata about factors identifying types of sensitive information being stored in respective files, such as personally identifiable information (PII), health care records, classified information, trade secrets, financial information, and the like.

As illustrated in FIG. 3, at step 304 one or more of the systems described herein may assign respective factor scores to respective factors based at least in part on the factor-specific information. The systems described herein may perform step 304 in a variety of ways. For example, assigning module 106 may, as part of computing device 202 in FIG. 2, assign at least one respective factor score 123 to at least one respective factor 124 based at least in part on factor-specific information 121. All factors listed herein need not be used for determining all risk scores.

In some examples, the at least one respective factor may be in a plurality of factors. The plurality of factors and/or the at least one respective factor may include a factor indicating sensitivity of information in a respective file. In one non-limiting example, the weight of this factor may fall in a range between 0.1 and 0.3, although other ranges may also be desirable or useful. See the description about step 306 below for additional details about factor weights.

The plurality of factors and/or the at least one respective factor may include a factor indicating permission distance between multiple categories of users who are permitted to access the respective file. In one non-limiting example, the weight of this factor may fall in a range between 0.15 and 0.32, although other ranges may also be desirable or useful. Permission distances may occur between subdivisions of organizations. In some examples, a human resources department may share files with a legal department more frequently than the human resources department shares the files with an engineering department, thus permission distances between the human resources department and the legal department are shorter than the permission distances between the human resources department and the engineering department for these shared files.

In some embodiments, the plurality of factors and/or the at least one respective factor may include a factor indicating a percentage of total information, in a respective file, having at least a minimum level of sensitivity. In one non-limiting, the weight of this factor may fall in a range between 0.05 and 0.17, although other ranges may also be desirable or useful.

In an embodiment, the plurality of factors and/or the at least one respective factor may include a factor indicating a percentage of total users who are permitted to access the respective file. In one non-limiting example, the weight of this factor may fall in a range between 0.04 and 0.1, although other ranges may also be desirable or useful.

In an example, the plurality of factors and/or the at least one respective factor may include a factor indicating a percentage of total users who are permitted to access sensitive files. In one non-limiting example, the weight of this factor may fall in a range between 0.15 and 0.22, although other ranges may also be desirable or useful.

In some examples, the plurality of factors and/or the at least one respective factor may include a factor indicating a percentage of unique tags associated with the respective file. In one non-limiting example, the weight of this factor may fall in a range between 0.01 and 0.06, although other ranges may also be desirable or useful.

In some embodiments, the plurality of factors and/or the at least one respective factor may include a factor indicating a percentage of highly sensitive files in a plurality of sensitive files. In one non-limiting example, the weight of this factor may fall in a range between 0.03 and 0.31, although other ranges may also be desirable or useful.

In an embodiment, the plurality of factors and/or the at least one respective factor may include a factor indicating an average number of instances of patterns per sensitive file. In one non-limiting example, the weight of this factor may fall in a range between 0.01 and 0.24, although other ranges may also be desirable or useful.

In an example, the plurality of factors and/or the at least one respective factor may include a factor indicating a location of the respective file. In one non-limiting example, the weight of this factor may fall in a range between 0.02 and 0.24, although other ranges may also be desirable or useful.

In some examples, the plurality of factors and/or the at least one respective factor may include a factor indicating characteristics of a control point. In one non-limiting example, the weight of this factor may fall in a range between 0.04 and 0.35, although other ranges may also be desirable or useful.

In some embodiments, the plurality of factors and/or the at least one respective factor may include a factor indicating a type of data source associated with the respective file. In one non-limiting example, the weight of this factor may fall in a range between 0.04 and 0.36, although other ranges may also be desirable or useful.

In an embodiment, the plurality of factors and/or the at least one respective factor may include a factor indicating a level of security for the storage device storing the respective file. In one non-limiting example, the weight of this factor may fall in a range between 0.09 and 0.3, although other ranges may also be desirable or useful.

As illustrated in FIG. 3, at step 306 one or more of the systems described herein may calculate the risk scores from the factor score(s). The systems described herein may perform step 306 in a variety of ways. For example, calculating module 108 may, as part of computing device 202 in FIG. 2, calculate risk score 125 from factor score 123.

In some examples, calculating the risk score may further include adding respective factor scores for different factors. In some embodiments, calculating the risk score may further include adding multiples of respective factor scores for different factors. In some examples, calculating the risk score may further include adding fractions of respective factor scores for different factors.

In some embodiments, calculating may further include weighting the at least one factor score with a respective weight, as some factors may be associated with higher levels of risk than other factors. In some examples, calculating the risk score may further include adding weighted respective factor scores for different factors.

In an example, risk scores may equal a sum of all weighted factor scores, where the sum may be divided by a total number of factors and then multiplied by 100 to provide risk score as a percentage.

In some examples, computer-implemented method 300 may further include receiving respective weights (e.g., user-provided custom weights) from a user interface and/or a network interface. In some examples, received weights may supersede respective prior weights assigned to factors.

In some examples, weights associated with respective factors may fall in a range between substantially zero and substantially one. In other examples, weights associated with respective factors may fall in a range between substantially zero percent and substantially one-hundred percent. In some examples, weights associated with respective factors may be a number greater or equal to than one. In other examples, weights associated with respective factors may be a negative number. In some embodiments, the respective weights of all factors may add to equal one. In other examples, weights associated with respective factors may be greater than zero and less than a full weight, where the weights associated with all respective factors used to calculate a risk score add to equal the full weight.

In an embodiment, the at least one respective factor may be in a plurality of factors having respective factor scores. In some examples, calculating the risk score may further include weighting the factor scores with respective weights, adding the respective weighted factor scores, and dividing the sum of the respective weighted factor scores by a total number of factors in the plurality of factors.

In some embodiments, calculating the risk score may further include calculating the risk score for at least one of a file, a directory, and/or a storage device.

In some embodiments, computer-implemented method 300 may further include performing an action on a file in response to a value of the risk score. In one embodiment, the action may include modifying a permission (e.g., read, write) to access the file. In some examples, risk scores may be used to trigger changes in classification frequency. For example, data stores including quantities of sensitive data exceeding thresholds may have risk scores recalculated more frequently than data stores including lower quantities of sensitive information. In some embodiments, high risk scores may trigger immediate remedial actions to minimize data privacy risk. In additional embodiments, data privacy software may automatically take actions based on risk scores to quickly minimize data privacy risk. In some examples, risk scores may be used to trigger actions, such as an action that prohibits the deletion of associated files, an action that prohibits the creation of permissions for associated files, among many other potential security-related actions.

In some embodiments, computer-implemented method 300 may further include displaying the risk score on a user display (e.g., display 150). Risk scores may displayed in the form of a report, such as a data privacy report and/or a compliance report. In an example, the provided techniques may sort and/or rank risk scores and/or associated devices based on risk scores and subsequently display the same in a ranked order.

In some embodiments, computer-implemented method 300 may further include sending information describing the risk score via a network interface (e.g., network interface 160) and/or a network (e.g., network 204). In some examples, risk scores may be communicated with a location remote from a location at which risk scores are calculated.

As detailed above, the steps outlined in method 300 in FIG. 3 may involve computing a risk score for stored information and, in some examples, automatically performing an action in response to the same. In some examples, the provided systems and methods may determine factor scores that describe the risk associated with respective risk factors and then determine a risk score therefrom. By automatically computing risk scores for stored information (and automatically identifying and performing one or more actions that correspond to the same), the disclosed systems and methods may securely manage and provide a higher level of protection for sensitive information. The systems and methods described herein may also improve the functionality of computer storage devices by automatically improving data protection services and associated software. The systems and methods described herein may also save power and/or better-manage network bandwidth utilization by automatically limiting access to sensitive files having high respective risk scores.

FIG. 4 depicts an example of a user display device 400 including a display 404 (such as display 150 detailed above) which may present a user interface 406. In this non-limiting example, user display device 400 may display a risk score display 402 identifying associated risk scores for at least one storage device. In some examples, risk score display 402 may include a report indicating risk scores (e.g., risk score 125). In some embodiments, risk score display 402 may include at least one warning message as at least a part of a security action in response to identifying at least one risk score that exceeds at least one threshold.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that may be running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that may be abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for computing a risk score for stored information, at least a portion of the method being performed by a computing device comprising at least one processor, the method comprising:
   extracting, automatically by an extracting module of the computing device, factor-specific information from file metadata, wherein the file metadata describes characteristics of respective files stored on multiple storage devices;
   assigning at least one respective factor score to at least one respective factor based at least in part on the factor-specific information, wherein the at least one respective factor comprises a factor indicating permission distance between multiple categories of users who are permitted to access a respective file in the respective files;
   calculating the risk score from the at least one factor score; and
   automatically limiting access to a sensitive file having a high risk score and that is in the files stored on the multiple storage devices.

2. The computer-implemented method of claim 1, wherein the file metadata associated with at least one of the files indicates at least one of:
   a file identifier;
   a file access attempt history;
   a file location;
   a file size; and
   a presence of sensitive information in the file.

3. The computer-implemented method of claim 1, wherein the at least one respective factor further comprises a factor indicating sensitivity of information in the respective file.

4. The computer-implemented method of claim 1, wherein the at least one respective factor further comprises:
   a factor indicating a percentage of total information, in a respective file, having at least a minimum level of sensitivity;
   a factor indicating a percentage of total users who are permitted to access the respective file;
   a factor indicating a percentage of total users who are permitted to access sensitive files;
   a factor indicating a percentage of unique tags associated with the respective file;
   a factor indicating a percentage of highly sensitive files in a plurality of sensitive files;
   a factor indicating an average number of instances of patterns per sensitive file;
   a factor indicating a location of the respective file;
   a factor indicating characteristics of a control point;
   a factor indicating a type of data source associated with the respective file; and
   a factor indicating a level of security for the storage device storing the respective file.

5. The computer-implemented method of claim 1, wherein calculating further comprises adding respective factor scores for different factors.

6. The computer-implemented method of claim 1, wherein calculating further comprises weighting the at least one factor score with a respective weight.

7. The computer-implemented method of claim 6, further comprising receiving the respective weight from a user interface.

8. The computer-implemented method of claim 1, wherein the at least one respective factor is in a plurality of factors having respective factor scores and calculating further comprises:
   weighting the respective factor scores with respective weights to form respective weighted factor scores;
   adding the respective weighted factor scores; and
   dividing the sum of the respective weighted factor scores by a total number of factors in the plurality of factors.

9. The computer-implemented method of claim 1, wherein calculating the risk score comprises calculating the risk score for at least one of a file, a directory, and a storage device.

10. The computer-implemented method of claim 1, further comprising performing an action on an additional file in response to a value of the risk score.

11. The computer-implemented method of claim 10, wherein the action comprises modifying a permission to access the additional file.

12. The computer-implemented method of claim 1, further comprising displaying, on a user display, the risk score.

13. The computer-implemented method of claim 1, further comprising sending information describing the risk score via a network interface.

14. A system for computing a risk score for stored information, the system comprising:
   an extracting module, stored in a memory device, that is configured to cause at least one physical processor to automatically extract factor-specific information from file metadata, wherein the file metadata describes characteristics of respective files stored on multiple storage devices;
   an assigning module, stored in the memory device, that assigns at least one respective factor score to at least one respective factor based at least in part on the factor-specific information, wherein the at least one respective factor comprises a factor indicating permission distance between multiple categories of users who are permitted to access a respective file in the respective files;
   a calculating module, stored in the memory device, that calculates the risk score from the at least one factor score and automatically limits access to a sensitive file having a high risk score and that is in the files stored on the multiple storage devices; and
   the at least one physical processor that executes the extracting module, the assigning module, and the calculating module.

15. The system of claim 14, wherein the at least one respective factor further comprises a factor indicating sensitivity of information in the respective file.

16. The system of claim 14, wherein the at least one respective factor further comprises:
   a factor indicating a percentage of total information, in a respective file, having at least a minimum level of sensitivity;
   a factor indicating a percentage of total users who are permitted to access the respective file;
   a factor indicating a percentage of total users who are permitted to access sensitive files;
   a factor indicating a percentage of unique tags associated with the respective file;
   a factor indicating a percentage of highly sensitive files in a plurality of sensitive files;

a factor indicating an average number of instances of patterns per sensitive file;

a factor indicating a location of the respective file;

a factor indicating characteristics of a control point;

a factor indicating a type of data source associated with the respective file; and a factor indicating a level of security for the storage device storing the respective file.

17. The system of claim 14, wherein the at least one respective factor is in a plurality of factors having respective factor scores and calculating the risk score further comprises:

weighting the respective factor scores with respective weights to form respective weighted factor scores;

adding the respective weighted factor scores; and dividing the sum of the respective weighted factor scores by a total number of factors in the plurality of factors.

18. A non-transitory computer-readable medium comprising one or more computer-executable instructions that, when executed by at least one processor of a computing device, cause the computing device to:

extract factor-specific information from file metadata, wherein the file metadata describes characteristics of respective files stored on multiple storage devices;

assign at least one respective factor score to at least one respective factor based at least in part on the factor-specific information, wherein the at least one respective factor comprises a factor indicating permission distance between multiple categories of users who are permitted to access a respective file in the respective files;

calculate a risk score from the at least one factor score; and automatically limit access to a sensitive file having a high risk score and that is in the files stored on the multiple storage devices.

19. The non-transitory computer-readable medium of claim 18, wherein the at least one respective factor further comprises a factor indicating sensitivity of information in the respective file.

20. The non-transitory computer-readable medium of claim 18, wherein the at least one respective factor further comprises:

a factor indicating a percentage of total information, in a respective file, having at least a minimum level of sensitivity;

a factor indicating a percentage of total users who are permitted to access the respective file;

a factor indicating a percentage of total users who are permitted to access sensitive files;

a factor indicating a percentage of unique tags associated with the respective file;

a factor indicating a percentage of highly sensitive files in a plurality of sensitive files;

a factor indicating an average number of instances of patterns per sensitive file;

a factor indicating a location of the respective file;

a factor indicating characteristics of a control point;

a factor indicating a type of data source associated with the respective file; and a factor indicating a level of security for the storage device storing the respective file.

21. The computer-implemented method of claim 1, wherein the categories of users in the multiple categories are organization subdivisions.

* * * * *